United States Patent
Yang et al.

(10) Patent No.: US 9,260,083 B2
(45) Date of Patent: Feb. 16, 2016

(54) AUTOMOBILE WIPER FLATLY ENGAGABLE WITH GLASS SURFACE

(71) Applicant: SCAN TOP ENTERPRISE CO., LTD., Taipei (TW)

(72) Inventors: Chih-Ming Yang, Taipei (TW); Chuan-Chih Chang, Taipei (TW)

(73) Assignee: SCAN TOP ENTERPRISE CO., LTD., Taipei (TW)

( * ) Notice: Subject to any disclaimer, the term of this patent is extended or adjusted under 35 U.S.C. 154(b) by 338 days.

(21) Appl. No.: 13/738,184

(22) Filed: Jan. 10, 2013

(65) Prior Publication Data

US 2014/0189974 A1     Jul. 10, 2014

(51) Int. Cl.
*B60S 1/38*     (2006.01)

(52) U.S. Cl.
CPC ........ *B60S 1/3801* (2013.01); *B60S 2001/3815* (2013.01); *B60S 2001/3843* (2013.01)

(58) Field of Classification Search
CPC .... B60S 1/3806; B60S 1/3801; B60S 1/0491; B60S 2001/3813; B60S 2001/3815; B60S 2001/3812
USPC .............. 15/250.44, 250.46, 250.39, 250.201
See application file for complete search history.

(56) References Cited

U.S. PATENT DOCUMENTS

| | | | | |
|---|---|---|---|---|
| 3,969,784 | A * | 7/1976 | Journee | 15/250.46 |
| 4,137,598 | A * | 2/1979 | Sharp | 15/250.46 |
| 4,180,885 | A * | 1/1980 | Thornton et al. | 15/250.32 |
| 4,418,441 | A * | 12/1983 | van den Berg | 15/250.46 |
| 5,862,567 | A * | 1/1999 | Kim | 15/250.201 |
| 6,516,491 | B2 | 2/2003 | Merkel et al. | |
| 6,643,889 | B1 | 11/2003 | Kotlarski | |
| 6,668,419 | B1 | 12/2003 | Kotlarski | |
| 7,603,742 | B2 * | 10/2009 | Nakano et al. | 15/250.201 |
| 2005/0166349 | A1 * | 8/2005 | Nakano et al. | 15/250.201 |
| 2008/0196192 | A1 * | 8/2008 | Yao | 15/250.46 |
| 2012/0167328 | A1 * | 7/2012 | Song et al. | 15/250.361 |
| 2013/0227810 | A1 * | 9/2013 | Tolentino et al. | 15/250.32 |

FOREIGN PATENT DOCUMENTS

DE     4116968 A1 * 11/1992
FR     2653083       * 4/1991

* cited by examiner

*Primary Examiner* — Gary Graham
(74) *Attorney, Agent, or Firm* — Chun-Ming Shih; HDLS IPR Services (57) ABSTRACT

An automobile wiper includes a fixed frame, a swing arm, a first pressing wing, a swing casing, a second pressing wing and a wiper blade. The fixed frame includes a fixed base and a fixed arm installed at the bottom of the fixed base, and the swing arm is pivotally coupled to a side of the fixed arm, and the first pressing wing is combined with an end of the swing arm, and the swing casing is coupled to the other end of the swing arm, and the second pressing wing is pivotally coupled to the swing casing, and the wiper blade is combined with the bottom of the first pressing wing and the second pressing wing, and the wiper blade is pressed by the first pressing wing and the second pressing wing and engaged flatly with a glass surface.

14 Claims, 11 Drawing Sheets

AUTOMOBILE WIPER FLATLY ENGAGABLE WITH GLASS SURFACE

FIELD OF THE INVENTION

The present invention relates to an automobile wiper, in particular to an automobile wiper flatly engageable with a glass surface.

BACKGROUND OF THE INVENTION

In general, the automobile wiper is installed on an outer side of an automobile glass for wiping rainwater or other foreign matters on the automobile glass. The conventional automobile wiper comprises an accessory base, a fixed base and a wiper blade, and the wiper blade is combined with the bottom of the fixed base to engage with a windshield, and the accessory base is installed at the top of the fixed base, and the accessory base is installed at an automobile wiper driving arm, and the wiper driving arm of the wiper drives a wiper to swing reciprocally on a glass surface, and a reaction force is applied to the wiper blade for wiping foreign substances on the windshield.

There are various structural designs of wipers (as disclosed in U.S. Pat. Nos. 6,516,491, 6,643,889 and 6,668,419) available in the market. Since the wiper is generally used for wiping rainwater, mist or mud on an automobile windshield to maintain a good vision for drivers and improve the driving safety, therefore a good wiper blade engaged closely with an automobile glass is required for achieve the effect of wiping rainwater effectively. Therefore, it is a motive for the inventor of the present invention to develop a wiper capable of maintaining a close engagement between a wiper blade and a windshield to improve the water wiping function.

In view of the foregoing problems, the inventor of the present invention based on years of experience in the related industry to conduct extensive researches and experiments, and finally invented a reasonable design to overcome the aforementioned problems.

SUMMARY OF THE INVENTION

Therefore, it is a primary objective of the present invention to provide an automobile wiper flatly engageable with a glass surface, so that a wiper blade can be engaged closely with an automobile glass to achieve the effect of wiping rainwater effectively.

The present invention relates to an automobile wiper flatly engageable with a glass surface, wherein a first pressing wing and a second pressing wing of the wiper press a wiper blade independently (instead of linking with each other), so as to improve the problem of the wiper blade unable to be engageed flatly with the glass surface due to uneven applied forces.

To achieve the aforementioned objective, the present invention provides an automobile wiper flatly engageable with a glass surface, comprising a fixed frame, a swing arm, first pressing wing, a second pressing wing and a wiper blade.

The fixed frame includes a fixed base and a fixed arm installed at the bottom of the fixed base, and the swing arm is pivotally coupled to a side of the fixed arm, and the first pressing wing is combined with an end of the swing arm, and the swing casing is coupled to the other end of the swing arm, and the second pressing wing is pivotally coupled to the swing casing, and the wiper blade is combined with the bottom of the first pressing wing and the second pressing wing, and the wiper blade is pressed by the first pressing wing and the second pressing wing and engaged flatly with a glass surface.

Compared with the prior art, an end of the swing arm of the present invention is pivotally coupled to the first pressing wing, and the other end of the swing arm is coupled to a swing casing having a second pressing wing, When the driving arm is driven, the first pressing wing and the second pressing wing are not linked with each other, so that the first pressing wing and the second pressing wing can press the wiper blade separately. During the wiping process of the wiper, the wiper pressure is adjusted continuously to keep the wiper blade to fit different curvatures of the glass surfaces or maintain an even applying force for the wiping process of the wiper. As a result, the wiper blade can be engaged closely with the glass surface for wiping and cleaning operations, so as to prevent the first pressing wing and the second pressing wing from failing to press the wiper blade due to the uneven force applied by the driving arm.

DESCRIPTION OF THE PREFERRED EMBODIMENTS

The technical contents of the present invention will become apparent with the detailed description of preferred embodiments accompanied with the illustration of related drawings as follows.

Figure 1:
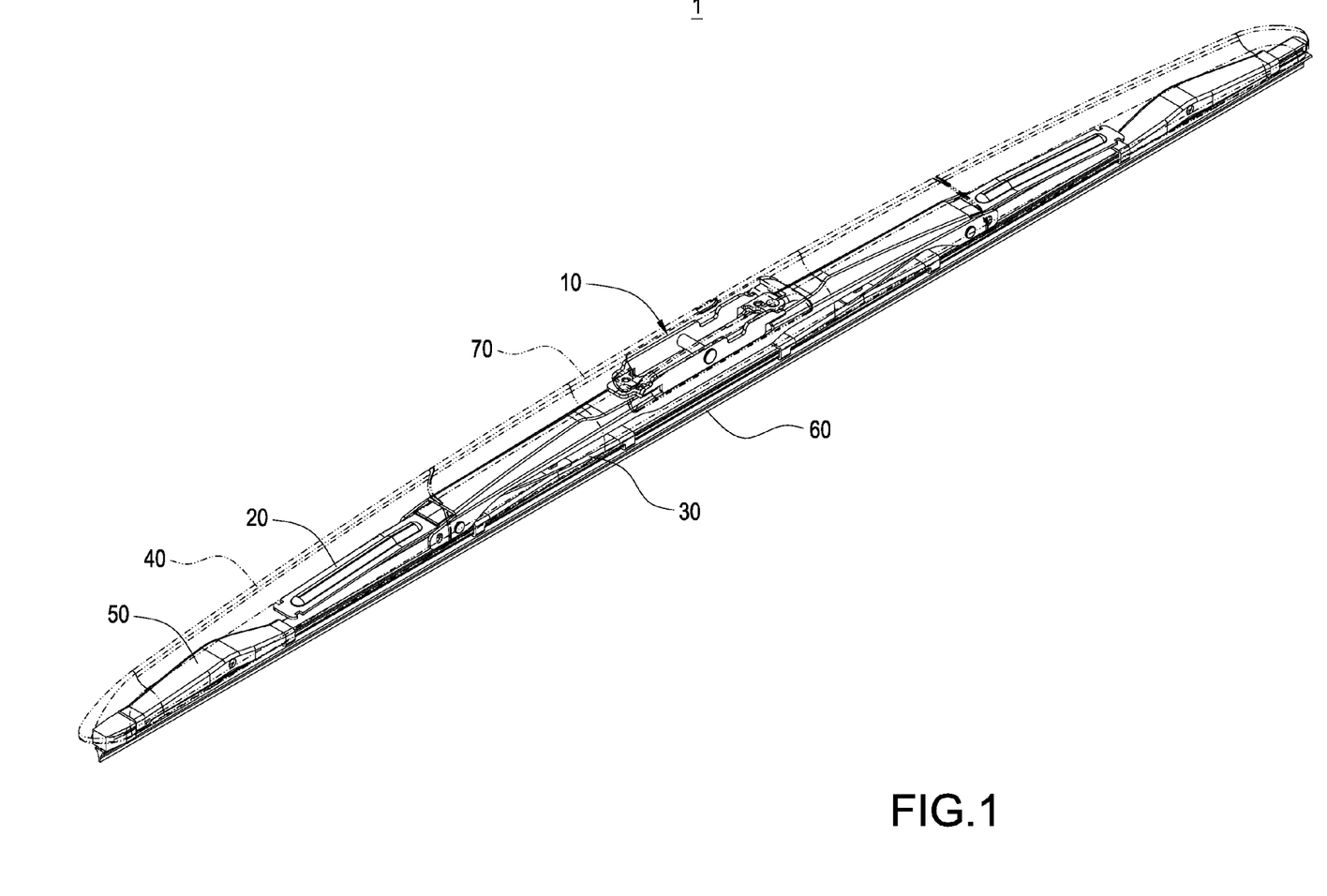
FIG. 1 is a perspective view of an automobile wiper of the present invention.

With reference to FIG. 1 for a perspective view of an automobile wiper of the present invention, the automobile wiper 1 comprises a fixed frame 10, a swing arm 20, at least one first pressing wing 30, a swing casing 40, at least one second pressing wing 50 and a wiper blade 60. During the use of the automobile wiper 1, the fixed frame 10 is coupled to an accessory base (not shown in the figure), and the accessory base is provided for connecting a driving arm (not shown in the figure), so that the automobile wiper 1 can be driven by the driving arm and flatly engaged with a glass surface (not shown in the figure).

Figure 2:
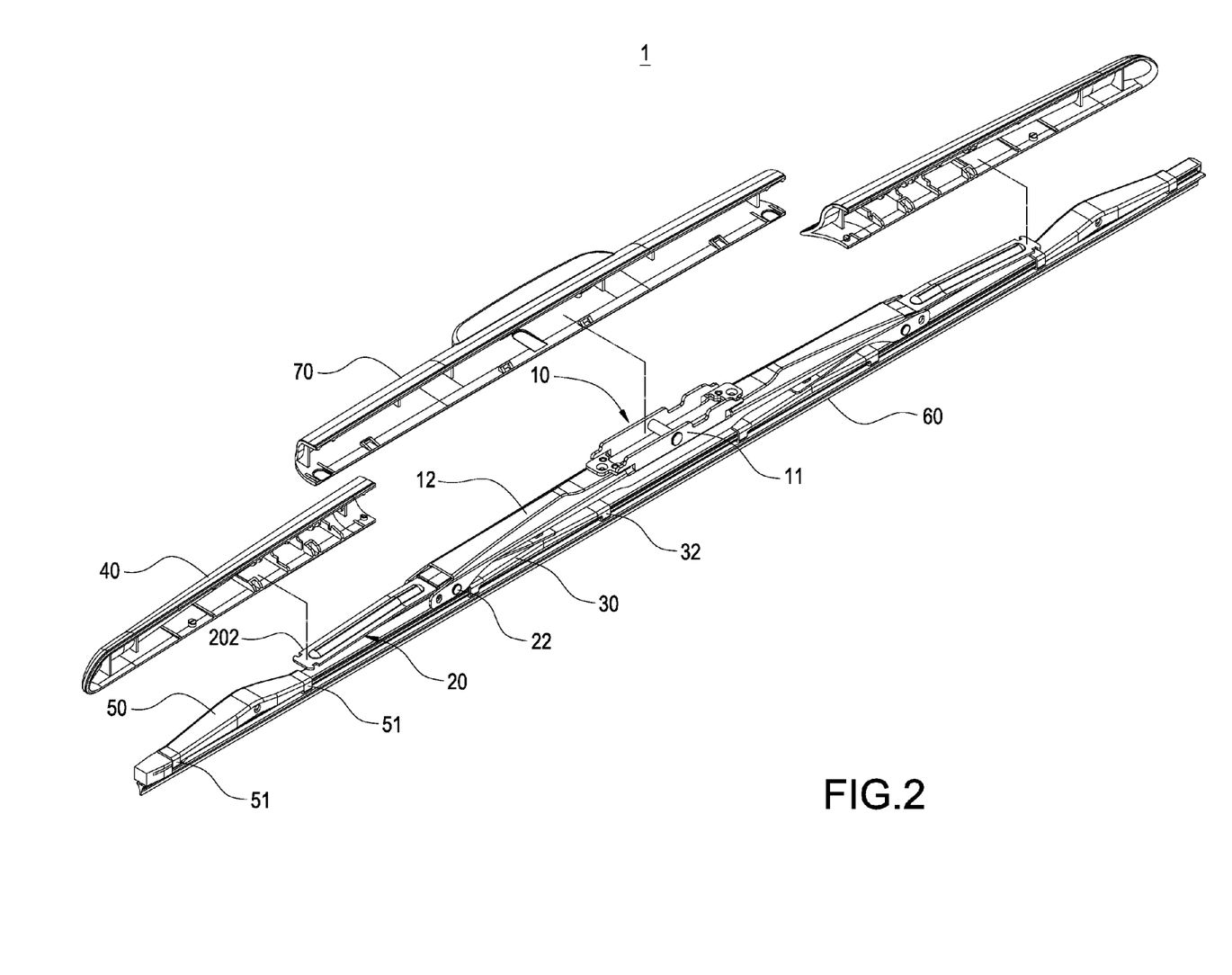
FIG. 2 is an exploded view of an automobile wiper of the present invention.
Figure 3:
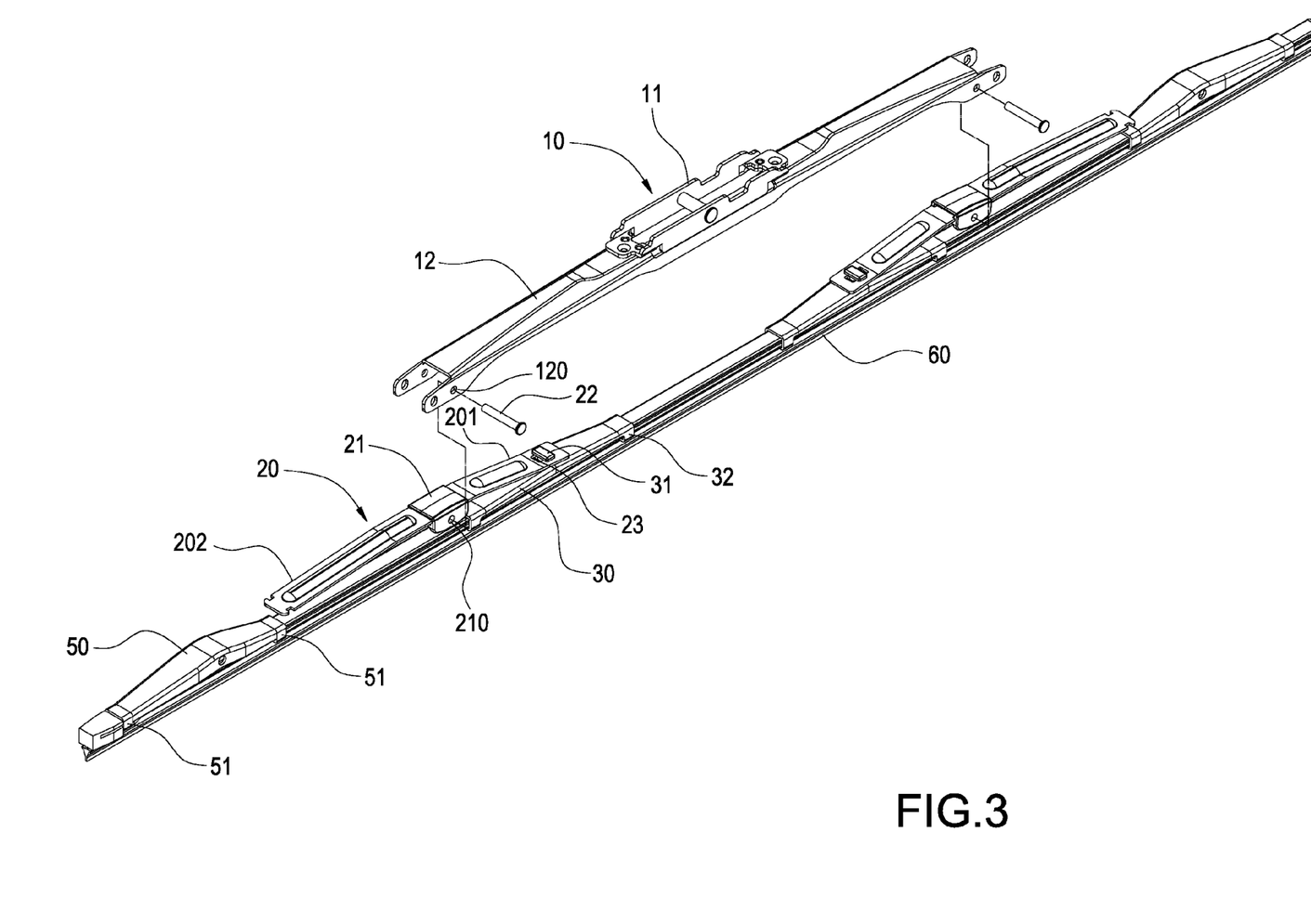
FIG. 3 is a first partial exploded view of an automobile wiper of the present invention.
Figure 4:
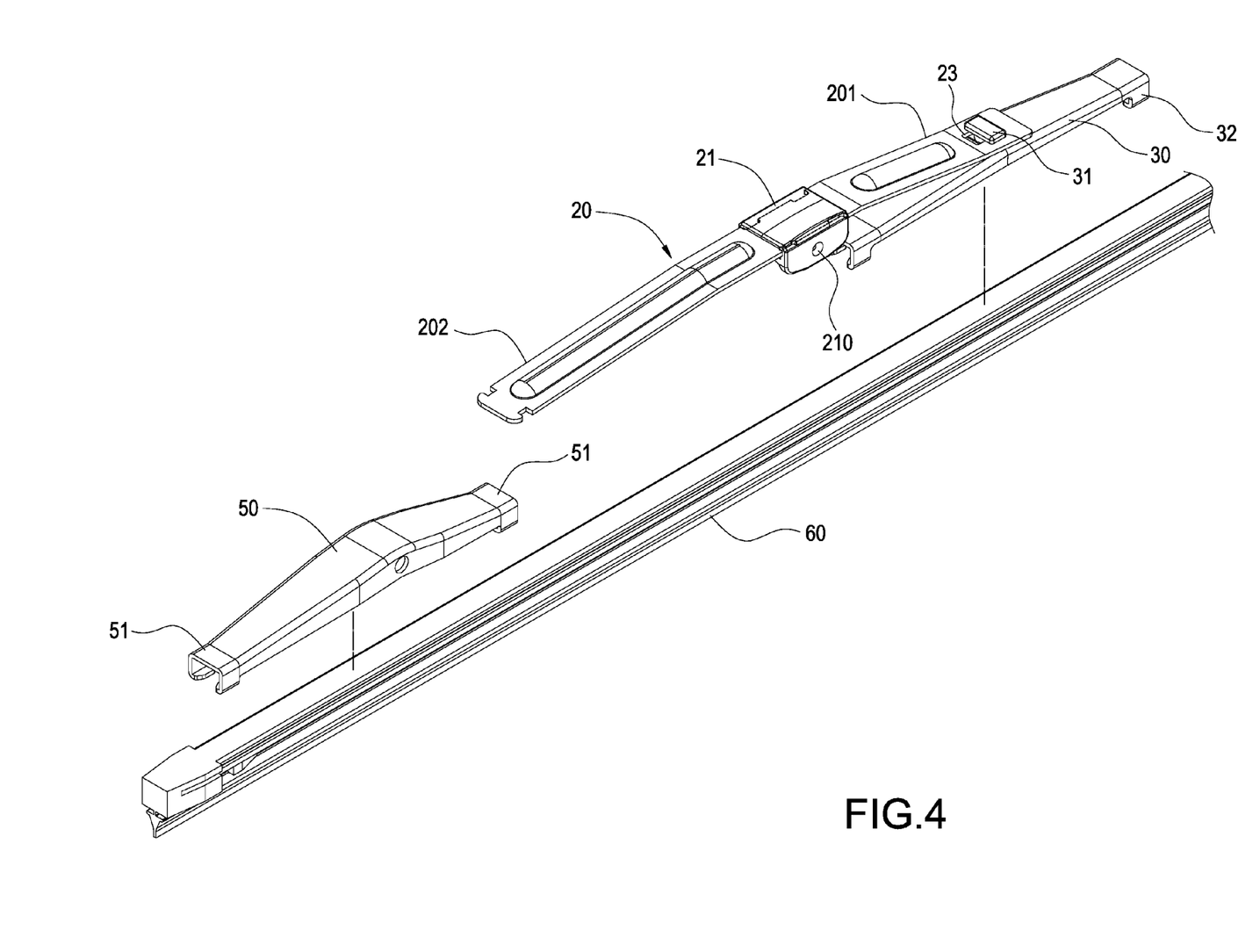
FIG. 4 is a second partial exploded view of an automobile wiper of the present invention.

With reference to FIGS. 2 to 4 for an exploded view and partial exploded views of an automobile wiper in accordance with a preferred embodiment of the present invention the present invention respectively, the fixed frame 10 includes a fixed base 11 for connecting the driving arm and a fixed arm 12 installed at the bottom of the fixed base 11, and the swing arm 20 is pivotally coupled to a side of the fixed arm 12. The fixed arm 12 is extended outwardly from both sides of the fixed base 11 and the fixed arm 12 has a pivot hole 120, so that the swing arm 20 can be pivotally coupled to the pivot hole 120.

Preferably, the swing arm 20 is an elastic plate made of a metal with elastic deformability. The swing arm 20 further includes a pivoting base 21 and a pivot 22, and the pivoting base 21 has a through hole 210 formed thereon and disposed at a position corresponding to the swing arm 20, and the pivot 22 is passed through the pivot hole 120 and the through hole 210 to connect the swing arm 20 to the fixed arm 12.

In addition, the first pressing wing 30 is fixed to an end of the swing arm 20. In this preferred embodiment, the first pressing wing 30 is substantially arch-shaped, and the middle of the first pressing wing 30 is higher than both sides of the first pressing wing 30. In this preferred embodiment, the swing arm 20 has an open slot 23 formed on a side of the swing arm 20, and the first pressing wing 30 has a snap block 31 disposed at the top of the first pressing wing 30, and the snap block 31 is snapped into the open slot 23 to combine the first pressing wing 30 onto the swing arm 20.

The swing casing 40 is a plastic casing coupled to the other end of the swing arm 20, and the second pressing wing 50 is pivotally coupled to the swing casing 40. The second pressing wing 50 has a shape substantially the same as that of the first pressing wing 30.

In addition, the wiper blade 60 is made of rubber and combined with the bottom of the first pressing wing 30 and the second pressing wing 50, and the wiper blade 60 is pressed by the first pressing wing 30 and the second pressing wing 50 to engage with a glass surface.

In a preferred embodiment of the present invention, the first pressing wing 30 further includes a plurality of first fastening frame plates 32 installed at both ends of the first pressing wing 30, and the wiper blade 60 is passed to the first fastening frame plates 32 and combined with the bottom of the first pressing wing 30. Similarly, the second pressing wing 50 also includes a plurality of second fastening frame plates 51 installed at both ends of the second pressing wing 50, and the wiper blade 60 is passed to the second fastening frame plates 51 and combined with the bottom of the second pressing wing 50.

More specifically, the swing arm 20 has an inner end 201 fixed to the first pressing wing 30 and a corresponding outer end 202, and the inner end 201 is disposed at a bottom surface of the fixed arm 12, and the outer end 202 is extended to an external side of the fixed arm 12.

In addition, the automobile wiper 1 comprises a fixed casing 70 disposed on an internal side of the swing casing 40 and covered onto the exterior of the fixed arm 12.

It is noteworthy that the quantity of first pressing wings 30 and second pressing wings 50 is not limited, but it can be adjusted according to actual needs. Since the swing casing 40 and the fixed casing 70 are designed with a streamlined shape according to the principle of aerodynamics, their wind resistance can be reduced effectively, when a car is driving in a high speed to produce a pressurized shunt effect, so that the wiper blade 60 will not be lifted by airflows and it can maintain a quiet, flexible and stable wiping effect.

Figure 5:
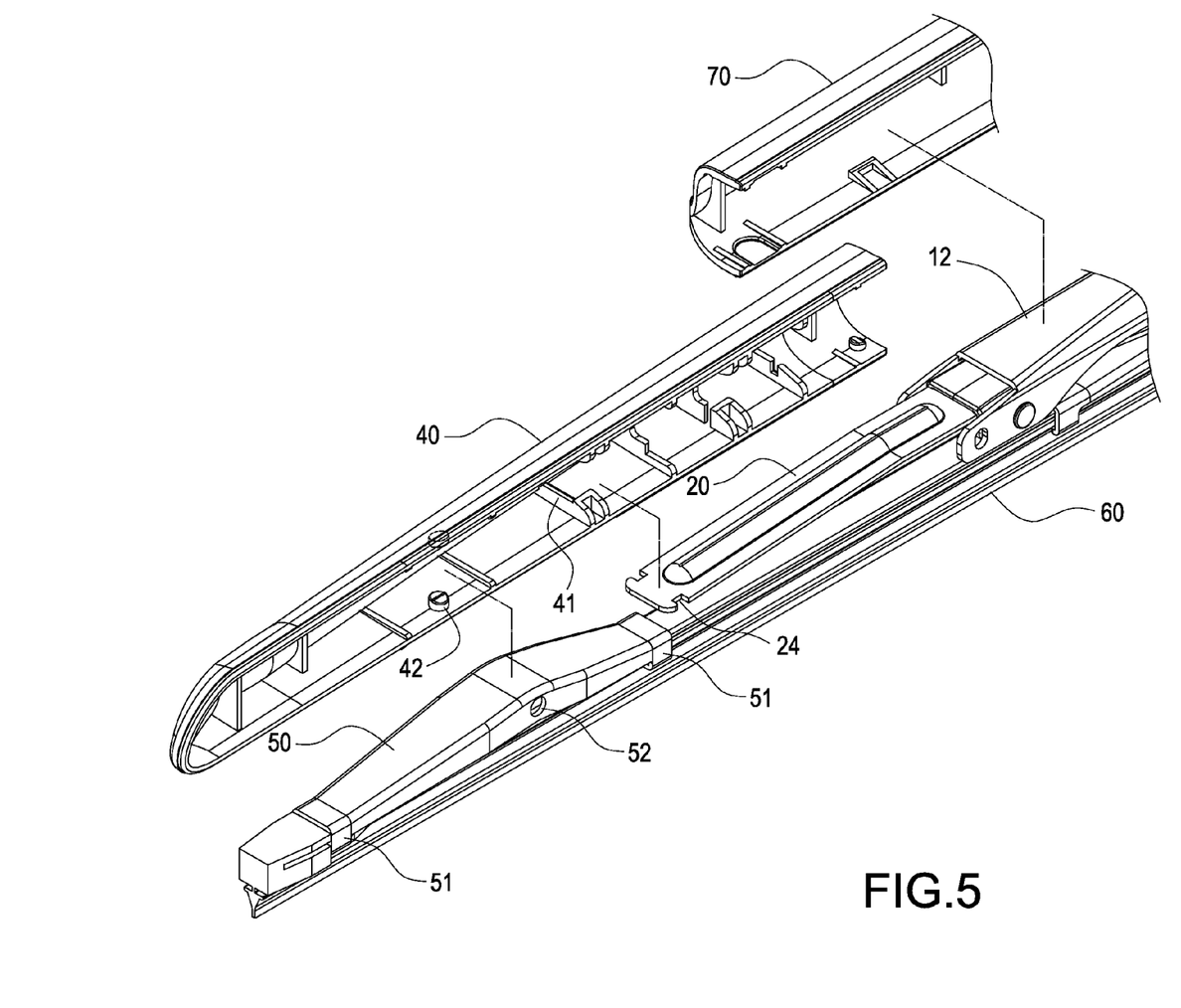
FIG. 5 is a perspective view of a swing casing and a swing arm of the present invention.
Figure 6:
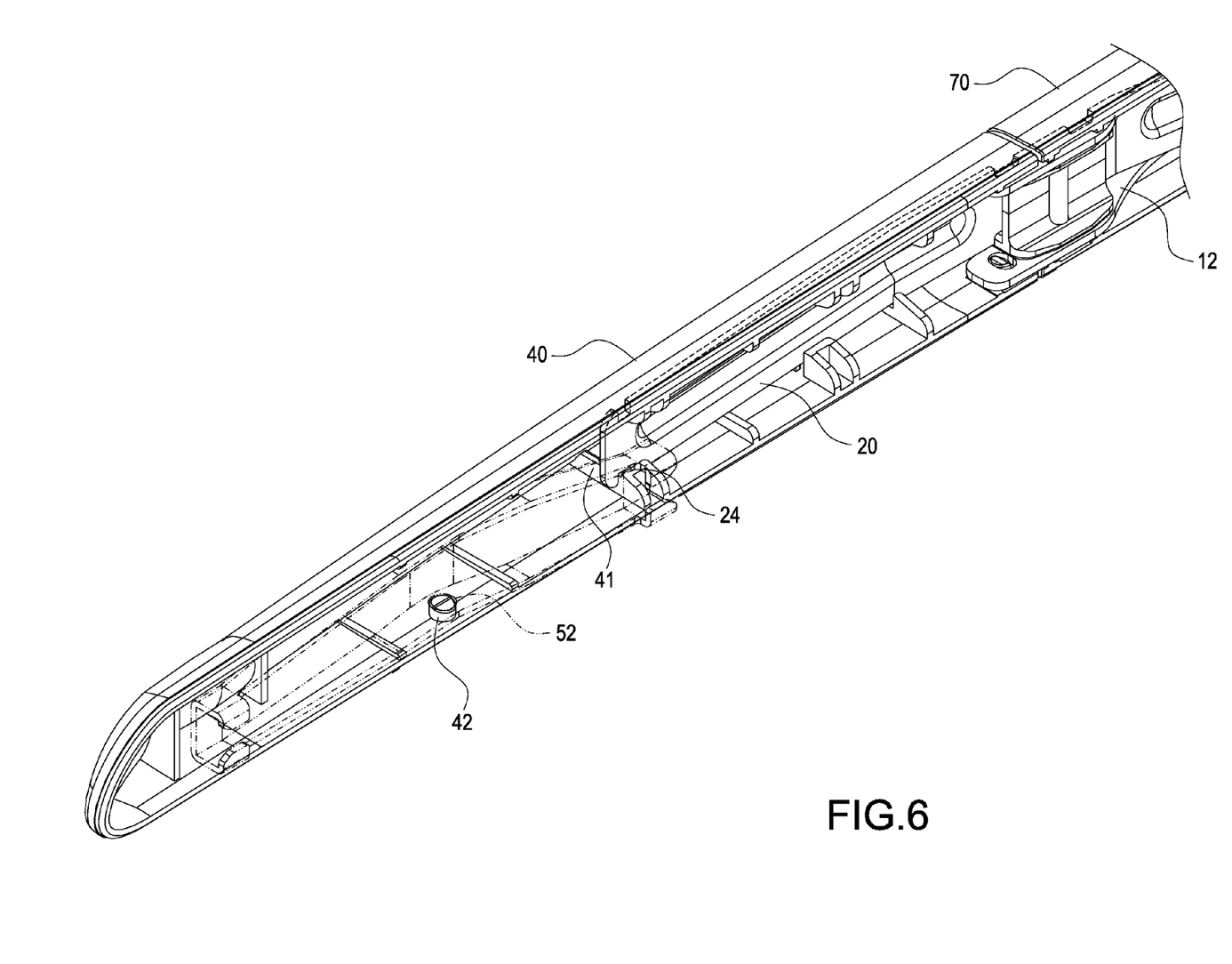
FIG. 6 is a perspective view of an assembly of a swing casing and a swing arm of the present invention.

With reference to FIGS. 5 and 6 for perspective views of a swing casing and a swing arm and their assembly of a preferred embodiment of the present invention respectively, the swing casing 40 has a protruding rib 41 disposed on an internal wall of the swing casing 40, and the swing arm 20 has a fastening slot 24 formed at the other end of the swing arm 20, and the swing casing 40 is plugged into the fastening slot 24 through the protruding rib 41 and combined with the other end of the swing arm 20.

In addition, the swing casing 40 has a protruding column 42 disposed on an internal wall of the swing casing 40, and the second pressing wing 50 has a snap hole 52 for snapping the protruding column 42, so that the other end of the fixed arm 12 can press the wiper blade 60 through the swing casing 40 and the second pressing wing 50.

Figure 7:
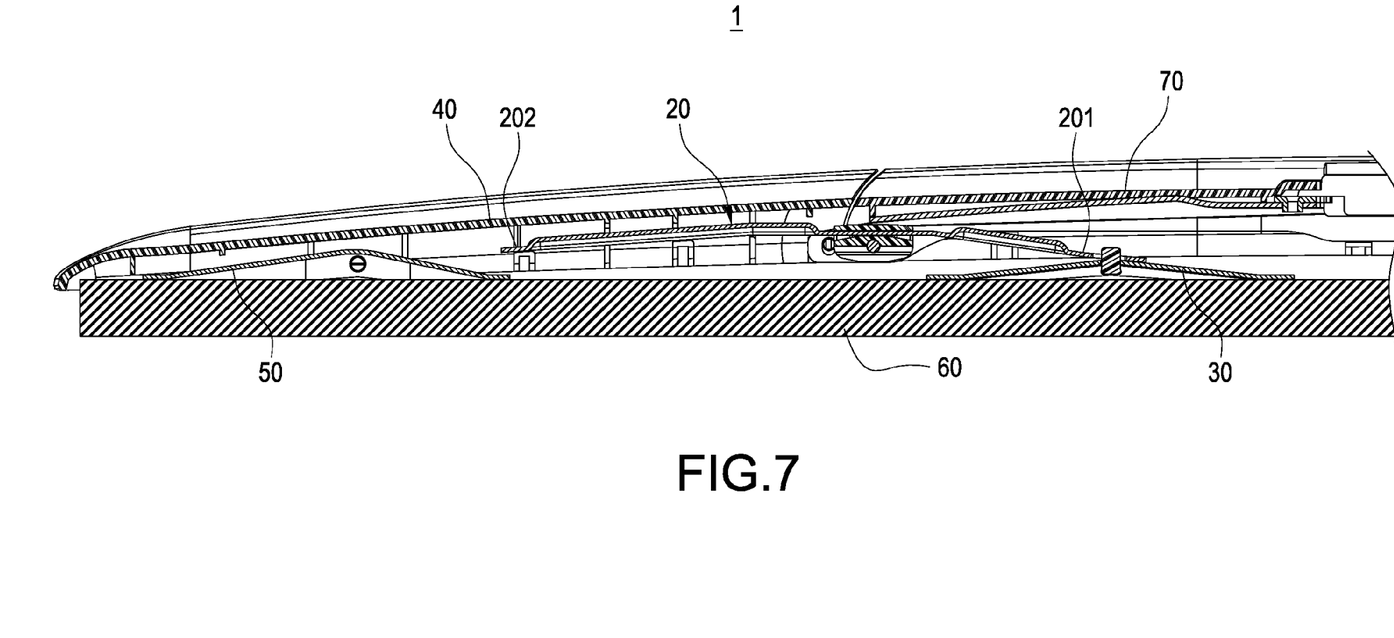
FIG. 7 is a cross-sectional view of an automobile wiper of the present invention.

With reference to FIG. 7 for a cross-sectional view of an automobile wiper of the present invention, the swing arm 20 is pivotally coupled to the fixed arm 12, and an end (which is an inner end 201) of the swing arm 20 is coupled to the first pressing wing 30. When the swing arm 20 is driven by a driving arm, the fixed arm 12 drives the first pressing wing 30 to press the wiper blade 60. On the other hand, the other end (which is an outer end 202 or a free end) of the swing arm 20 is coupled to the swing casing 40. In other words, the swing casing 40 can be moved and shaken together with the free end of the swing arm 20. In the meantime, the second pressing wing 50 pivotally coupled to the swing casing 40 is driven to move together with the free end of the swing arm 20 and press the wiper blade 60.

Therefore, the first pressing wing 30 and the second pressing wing 50 can press the wiper blade 60 to prevent them from affecting the operation of each other due to uneven applied forces, so that the wiper blade 60 can be engaged closely with a glass surface for wiping and cleaning operations.

Figure 8:
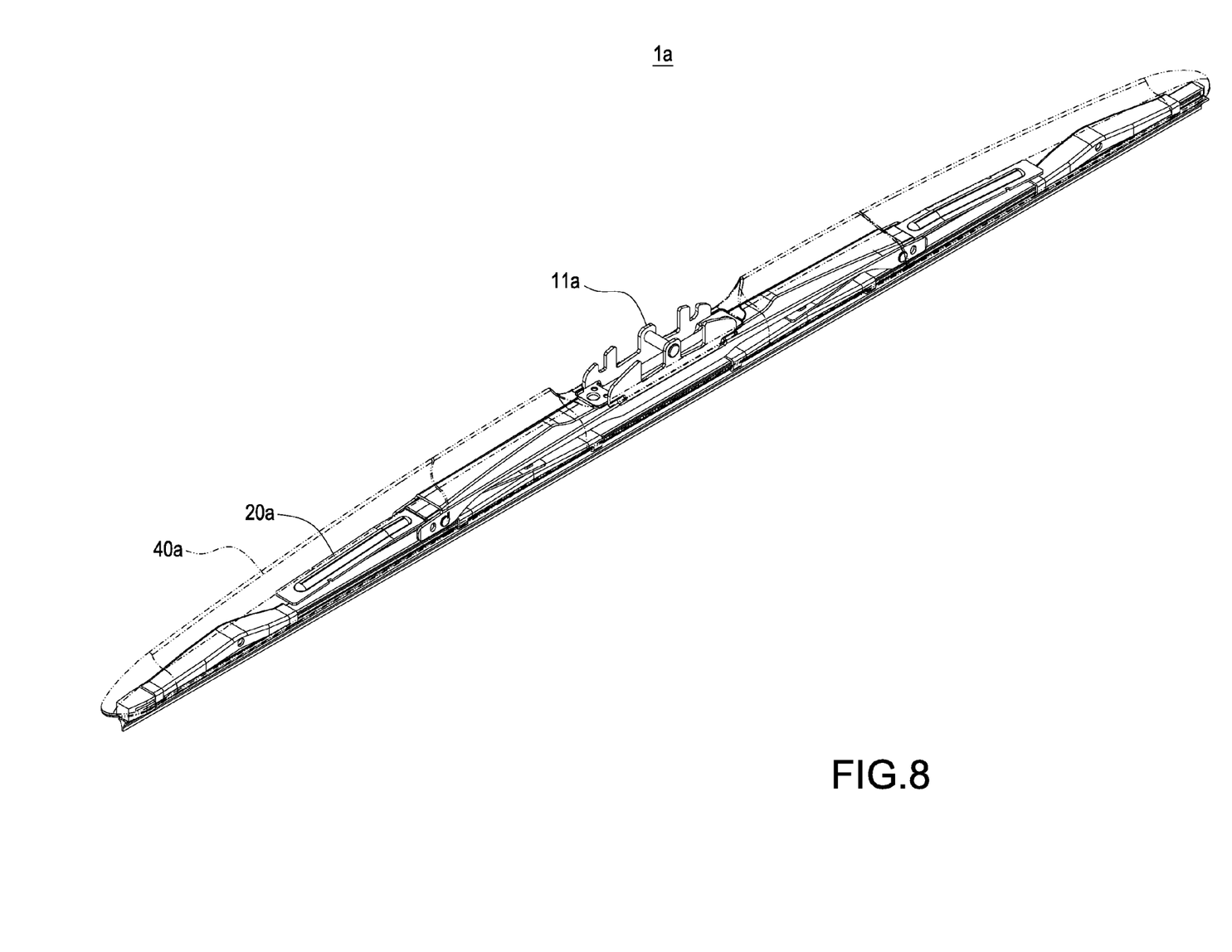
FIG. 8 is a perspective view of an automobile wiper of another preferred embodiment of the present invention.
Figure 9:
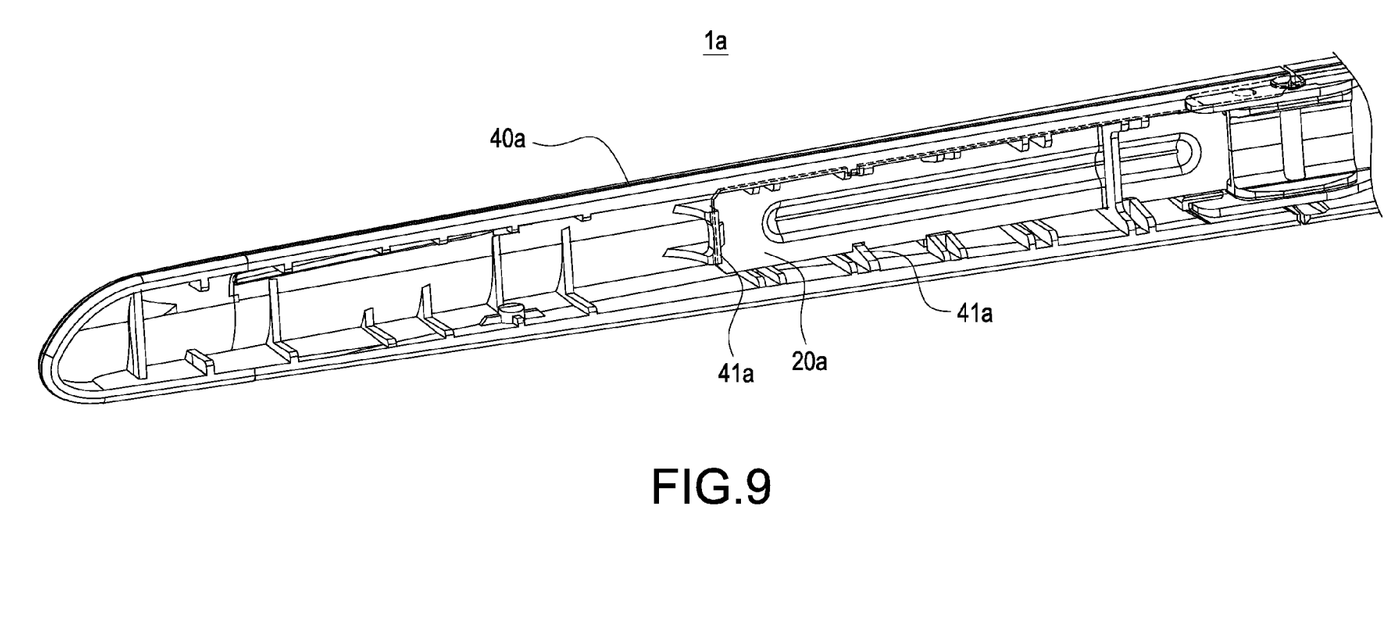
FIG. 9 is a schematic view of an automobile wiper of another preferred embodiment of the present invention.

With reference to FIGS. 8 and 9 for perspective views of an automobile wiper of another preferred embodiment of the present invention, this preferred embodiment is substantially the same as the first preferred embodiment, and their difference resides on the implementation mode of the fixed base 11a of the automobile wiper 1a. In this preferred embodiment, the fixed base 11a is provided for combining another accessory base. In addition, another difference is the mode of combining the swing casing 40a and the swing arm 20a. In this preferred embodiment, the swing casing 40a has a plurality of hooks 41a disposed on an internal wall of the swing casing 40a, and the swing arm 20a is latched onto the hooks 41a to combine the swing casing 40a with the swing arm 20a.

Figure 10:
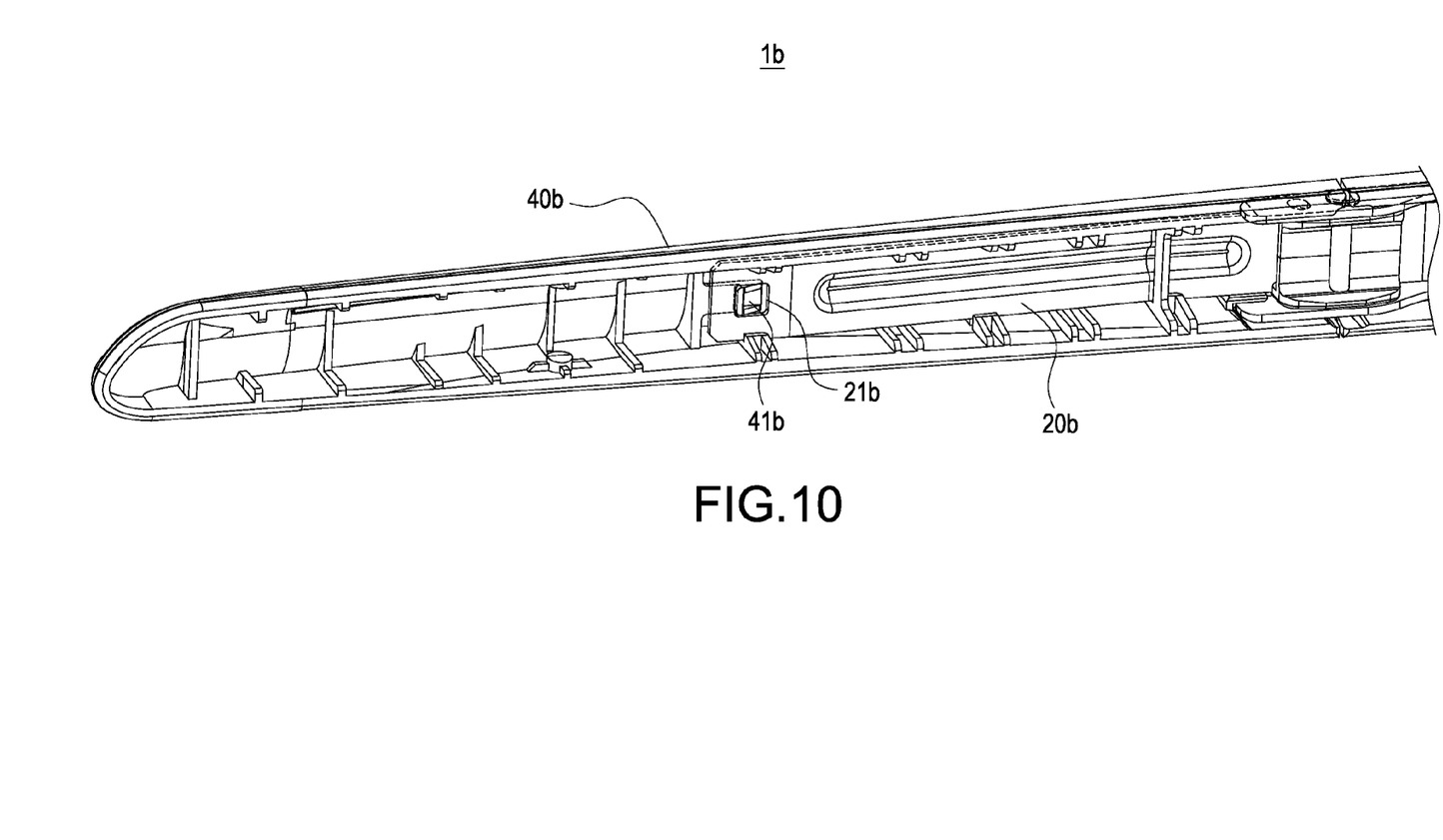
FIG. 10 is a perspective view of an automobile wiper of a further preferred embodiment of the present invention.

With reference to FIG. 10 for a perspective view of an automobile wiper of a further preferred embodiment of the present invention, this preferred embodiment is substantially the same as the previous preferred embodiment, and their difference resides on the mode of combining the swing casing 40b and the swing arm 20b of the automobile wiper 1b. The swing casing 40b has a bump 41b disposed on an internal wall of the swing casing 40b, and the swing arm 20b has a corresponding snap slot 21b for snapping the bump 41b into the snap slot 21b to combine the swing casing 40b with the swing arm 20b. In a preferred embodiment of the present invention, the bump 41b is an oblique bump, but the invention is not limited to oblique bumps only.

Figure 11:
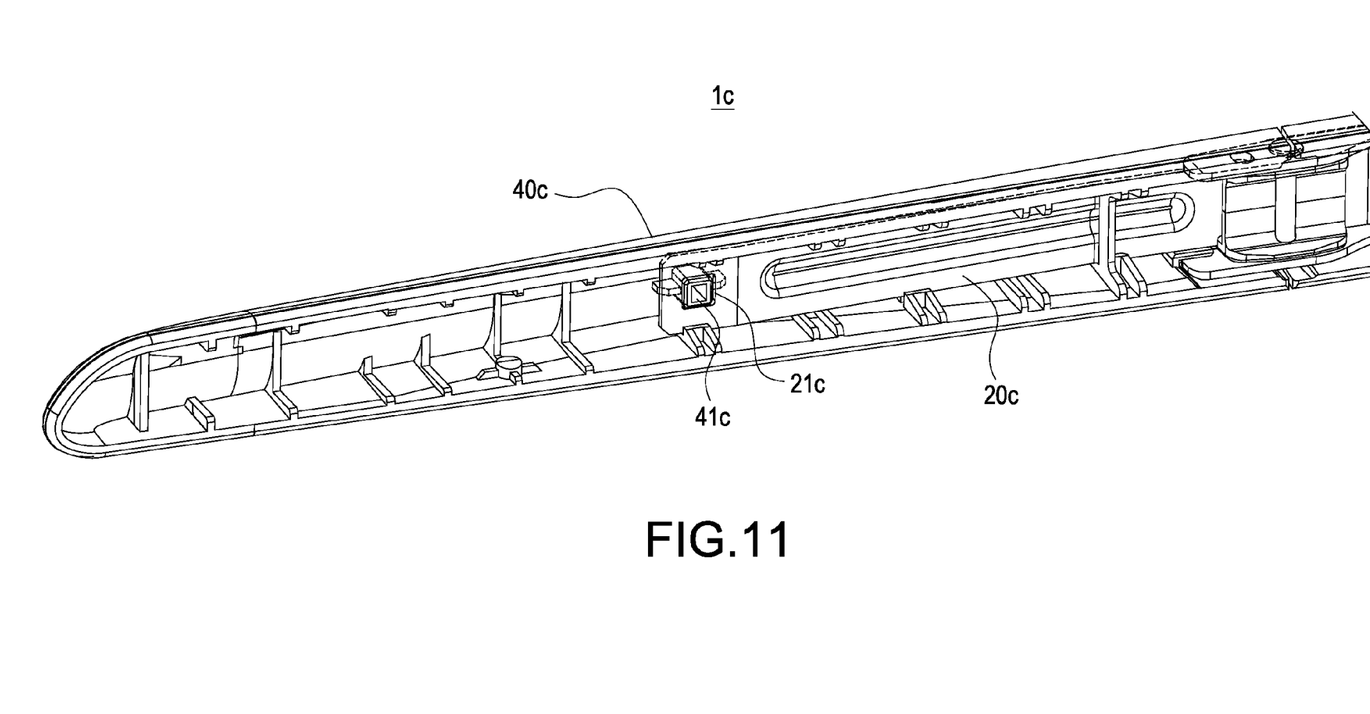
FIG. 11 is a perspective view of an automobile wiper of another further preferred embodiment of the present invention.

With reference to FIG. 11 for a perspective view of an automobile wiper of another further preferred embodiment of the present invention, this preferred embodiment is substantially the same as the previous preferred embodiment, and their difference resides on the type of the bump on the internal wall of the swing casing 40c of the automobile wiper 1c. In this preferred embodiment, the swing casing 40c has a square bump 41c disposed on an internal wall of the swing casing 40c, and the swing arm 20c has a corresponding snap slot 21c. Wherein, the square bump 41c has an end surface greater than the diameter of the snap slot 21*c* for snapping the square bump 41*c* into the snap slot 21*c* to combine the swing casing 40*c* with the swing arm 20*c*.

In summation of the description above, the present invention achieves the expected objectives and overcomes the drawbacks of the prior art, and the invention complies with patent application requirements, and is thud duly filed for patent application.

While the invention has been described by means of specific embodiments, numerous modifications and variations could be made thereto by those skilled in the art without departing from the scope and spirit of the invention set forth in the claims.

What is claimed is:

1. An automobile wiper flatly engageable with a glass surface, comprising:
    a fixed frame (10), including a fixed base (11, 11*a*) and a fixed arm (12) installed at a bottom surface of the fixed base (11);
    a swing arm (20, 20*a*, 20*b*, 20*c*), pivotally coupled to a side of the fixed arm (12);
    at least one first pressing wing (30), coupled to an end of the swing arm (20, 20*a*, 20*b*, 20*c*);
    a swing casing (40, 40*a*, 40*b*, 40*c*), coupled to and covering on the other end of the swing arm (20, 20*a*, 20*b*, 20*c*);
    at least one second pressing wing (50), pivotally coupled to and entirely covered by the swing casing (40, 40*a*, 40*b*); and
    a wiper blade (60), coupled to a bottom of the first pressing wing (30) and the second pressing wing (50), and pressed by the first pressing wing (30) and the second pressing wing (50) to engage the glass surface.

2. The automobile wiper flatly engageable with a glass surface according to claim 1, wherein the fixed arm (12) is extended outwardly from both sides of the fixed base (11) and has a pivot hole (120) provided for pivotally coupling the swing arm (20) to the pivot hole (120).

3. The automobile wiper flatly engageable with a glass surface according to claim 2, wherein the swing arm (20) further includes a pivoting base (21) and a pivot (22), and the pivoting base (21) has a through hole (210), and the pivot (22) is passed through the pivot hole (120) and the through hole (210) to combine the swing arm (20) onto the fixed arm (12).

4. The automobile wiper flatly engageable with a glass surface according to claim 3, wherein the swing arm (20) has an inner end (201) fixed to the first pressing wing (30) and a corresponding outer end (202), and the inner end (201) is disposed at a bottom surface of the fixed arm (12), and the outer end (202) is extended from an external side of the fixed arm (12).

5. The automobile wiper flatly engageable with a glass surface according to claim 2, wherein the swing arm (20) is an elastic plate.

6. The automobile wiper flatly engageable with a glass surface according to claim 1, wherein the first pressing wing (30) further includes a plurality of first fastening frame plates (32) installed on the first pressing wing (30), and the wiper blade (60) is passed to the first fastening frame plates (32) and combined with the bottom of the first pressing wing (30).

7. The automobile wiper flatly engageable with a glass surface according to claim 1, wherein the swing arm (20) has an open slot (23) formed on a side of the swing arm (20), and the first pressing wing (30) has a snap block (31) disposed at a top of the first pressing wing (30) and snapped into the open slot (23) to combine the first pressing wing (30) onto the swing arm (20).

8. The automobile wiper flatly engageable with a glass surface according to claim 1, wherein the second pressing wing (50) further includes a plurality of second fastening frame plates (51) installed onto the second pressing wing (50), and the wiper blade (60) is passed to the second fastening frame plates (51) and combined with a bottom of the second pressing wing (50).

9. The automobile wiper flatly engageable with a glass surface according to claim 1, further comprising a fixed casing (70) covering the exterior of the fixed arm (12).

10. The automobile wiper flatly engageable with a glass surface according to claim 1, wherein the swing casing (40) has a protruding rib (41) disposed on an internal wall of the swing casing (40), and a fastening slot (24) formed at the other end of the swing arm (20), and the swing casing (40) is plugged into the fastening slot (24) through the protruding rib (41) and combined with the other end of the swing arm (20).

11. The automobile wiper flatly engageable with a glass surface (1) according to claim 1, wherein the swing casing (40*a*) has a plurality of hooks (41*a*) disposed on an internal wall of the swing casing (40*a*), and the swing arm (20*a*) is latched onto the hooks (41*a*).

12. The automobile wiper flatly engageable with a glass surface according to claim 1, wherein the swing casing (40*b*) has a bump (41*b*) formed on an internal wall of the swing casing (40*b*), and the swing arm (20*b*) has a corresponding snap slot (21*b*), and the bump (41*b*) is snapped into the snap slot (21*b*).

13. The automobile wiper flatly engageable with a glass surface according to claim 1, wherein the swing casing (40*c*) has a square bump (41*c*) disposed on an internal wall of the swing casing (40*c*), and the swing arm (20*c*) has a corresponding snap slot (21*c*), and the square bump (41*c*) has an end surface greater than the diameter of the snap slot (21*c*), and the square bump (41*c*) is snapped into the snap slot (21*c*).

14. The automobile wiper flatly engageable with a glass surface according to claim 1, wherein the swing casing (40) has a protruding column (42) disposed on an internal wall of the swing casing (40), and the second pressing wing (50) has a snap hole (52), and the protruding column (42) is fastened onto the snap hole (52), and the other end of the fixed arm (12) presses the wiper blade (60) through the swing casing (40) and the second pressing wing (50).

* * * * *